United States Patent
Walton

(10) Patent No.: US 12,487,747 B2
(45) Date of Patent: Dec. 2, 2025

(54) PADDING SYNCHRONOUS WRITE DATA WITH BACKGROUND WRITE DATA BASED ON STORAGE SYSTEM BOUNDARY ALIGNMENT AND SIZE DATA

(71) Applicant: Dell Products L.P., Round Rock, TX (US)

(72) Inventor: Jonathan Walton, Seattle, WA (US)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 18/458,353

(22) Filed: Aug. 30, 2023

(65) Prior Publication Data

US 2025/0077080 A1    Mar. 6, 2025

(51) Int. Cl.
*G06F 3/06* (2006.01)

(52) U.S. Cl.
CPC .......... *G06F 3/0613* (2013.01); *G06F 3/0656* (2013.01); *G06F 3/0676* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88;
(Continued)

(56) References Cited

U.S. PATENT DOCUMENTS 7,913,061 B2 *   3/2011   Gorobets .............. G06F 11/141
                                                                711/161
8,321,650 B2 *  11/2012   Steinmetz ........... H04L 67/1097
                                                             711/E12.001

(Continued)

OTHER PUBLICATIONS

M. Wang and Y. Hu, "Exploit real-time fine-grained access patterns to partition write buffer to improve SSD performance and lifespan," 2013 IEEE 32nd International Performance Computing and Communications Conference (IPCCC), San Diego, CA, USA, 2013, pp. 1-7, doi: 10.1109/PCCC.2013.6742772. (Year: 2013).*

*Primary Examiner* — Daniel C. Chappell
(74) *Attorney, Agent, or Firm* — Amin, Turocy & Watson, LLP

(57) ABSTRACT

The technology described herein is directed towards using background data to be written to a storage system as padding material that is combined with synchronous/client data writes to make data writes optimally-sized for the storage system. Instead of treating background work's data as a separate data stream of data to be written, some of the background data is preemptively maintained for padding the client I/O to optimal boundaries for a storage system. As a new client I/O data write comes in, prior to being written the system uses some of the preemptive padding to obtain an optimally-sized I/O data write. When that combined I/O operation completes, the client write is completed along with completing some amount of background data writing. Described are various ways to maintain the padding data store, as well as batching of some client I/O data received within a timeframe before writing.

20 Claims, 11 Drawing Sheets

(58) Field of Classification Search
CPC .. G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 8,521,955 B2* | 8/2013 | Arulambalam | ....... | G06F 3/0613 714/6.22 |
| 10,572,379 B2* | 2/2020 | Guo | ............ | G06F 12/0246 |
| 11,157,187 B2* | 10/2021 | Zhang | ............ | G06F 3/0673 |
| 11,182,667 B2* | 11/2021 | Petre | ............ | G06F 12/08 |
| 11,934,695 B2* | 3/2024 | Chandramani | ....... | G06F 3/0673 |
| 11,955,203 B2* | 4/2024 | Yang | ............ | G11C 7/1069 |
| 2005/0135395 A1* | 6/2005 | Fan | ............ | H04L 49/9026 370/412 |
| 2005/0141313 A1* | 6/2005 | Gorobets | ............ | G06F 11/141 711/E12.008 |
| 2008/0162811 A1* | 7/2008 | Steinmetz | ............ | G06F 3/0689 711/171 |
| 2009/0141844 A1* | 6/2009 | Tripathi | ............ | H04L 25/14 375/372 |
| 2009/0157971 A1* | 6/2009 | Liu | ............ | G06F 12/0886 711/E12.016 |
| 2013/0091237 A1* | 4/2013 | Arulambalam | .. | G11B 20/00521 709/213 |
| 2015/0242310 A1* | 8/2015 | Guo | ............ | G06F 12/0246 711/103 |
| 2017/0192702 A1* | 7/2017 | Xu | ............ | G06F 3/068 |
| 2018/0300607 A1* | 10/2018 | Petre | ............ | G06F 1/3287 |
| 2021/0117090 A1* | 4/2021 | Zhang | ............ | G06F 3/0608 |
| 2022/0214810 A1* | 7/2022 | Adams | ............ | G06F 3/0689 |
| 2022/0413756 A1* | 12/2022 | Chandramani | ............ | G06F 3/061 |
| 2023/0360682 A1* | 11/2023 | Yang | ............ | G11C 7/14 |

* cited by examiner

| | | Latency | Expense | Notes |
|---|---|---|---|---|
| Optimized write | | Lowest (fast) | Lowest | Required size/alignment |
| Persistent buffer | | Medium | High | Temporarily write to alternate destination, e.g., NVDIMM or mirrored SSD. Adds computational and I/O cost, and a bit of extra latency. |
| RAM buffer, w/ defer | | High (slow) | Low | Temporarily hold in RAM. When persistence is required, something has to be blocked until achieved .... whether in the client or over the protocol. Doing so adds latency, until ready to commit to the final destination. |
| Typical Storage | Background | Lowest | Lowest | (designed for optimized write) |
| | Client I/O | Medium | Medium | Some combination of persistent and RAM buffering |
| Preemptive Pad Storage | Background | Low/Medium | Low | (optimized write, with some RAM defer) |
| | Client I/O | Low | Low | Use prepackaged/waiting background I/O to pad to optimized write size/alignment |

FIG. 3

PADDING SYNCHRONOUS WRITE DATA WITH BACKGROUND WRITE DATA BASED ON STORAGE SYSTEM BOUNDARY ALIGNMENT AND SIZE DATA

BACKGROUND

Many storage systems do not efficiently support small data write operations with low latency. Various reasons for such inefficiency include that writes need to be aligned and sized to storage-media block boundaries that are typically larger than the size of a small data write. Further, to provide reliability and redundancy, in many storage systems data writes are distributed across multiple storage-media devices. Some systems attempt to mitigate boundary alignment issues or distributed write issues (or both) by storing the writes in a log-style destination to aggregate smaller writes into larger ones, and to avoid (or at least defer) read-modify-write operations.

BRIEF DESCRIPTION OF THE DRAWINGS

The technology described herein is illustrated by way of example and not limited in the accompanying figures in which like reference numerals indicate similar elements and in which:

FIG. 3 is an example table summarizing implications of various buffering and storage/data write techniques of different storage systems, including a storage system configured with preemptive padding, in accordance with various aspects and implementations of the subject disclosure.

DETAILED DESCRIPTION

Various aspects of the technology described herein are generally directed towards using data to be written as background data writes as a source of readily available, preemptive "padding" data that is combined with new client input/output (I/O) write data. The technology described herein thus provides a solution that can be used to pad small client synchronous writes to align with optimal boundaries for a given storage system.

In one example implementation, a background workload generally proceeds as before, but instead of creating a fully optimally-sized background payload for storing, the background workload creates some excess amount of payload material (the "preemptive padding"), and leaves the excess amount of padding data available. As a new client I/O data write is received, the storage system consumes an appropriately selected amount of the preemptive padding by combining with the new client I/O data into an optimally-sized I/O. When that I/O completes, the client has achieved the write objective, and the system has completed a certain amount of its background write objective.

It should be understood that any of the examples herein are non-limiting. As one example, the technology is described in a storage system environment in which there is an optimal size and alignment for data writes and in which data is laid out according to some protection scheme; however, this is only an example and can be implemented in similar environments, including those not yet implemented. It also should be noted that terms used herein, such as "optimization," "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
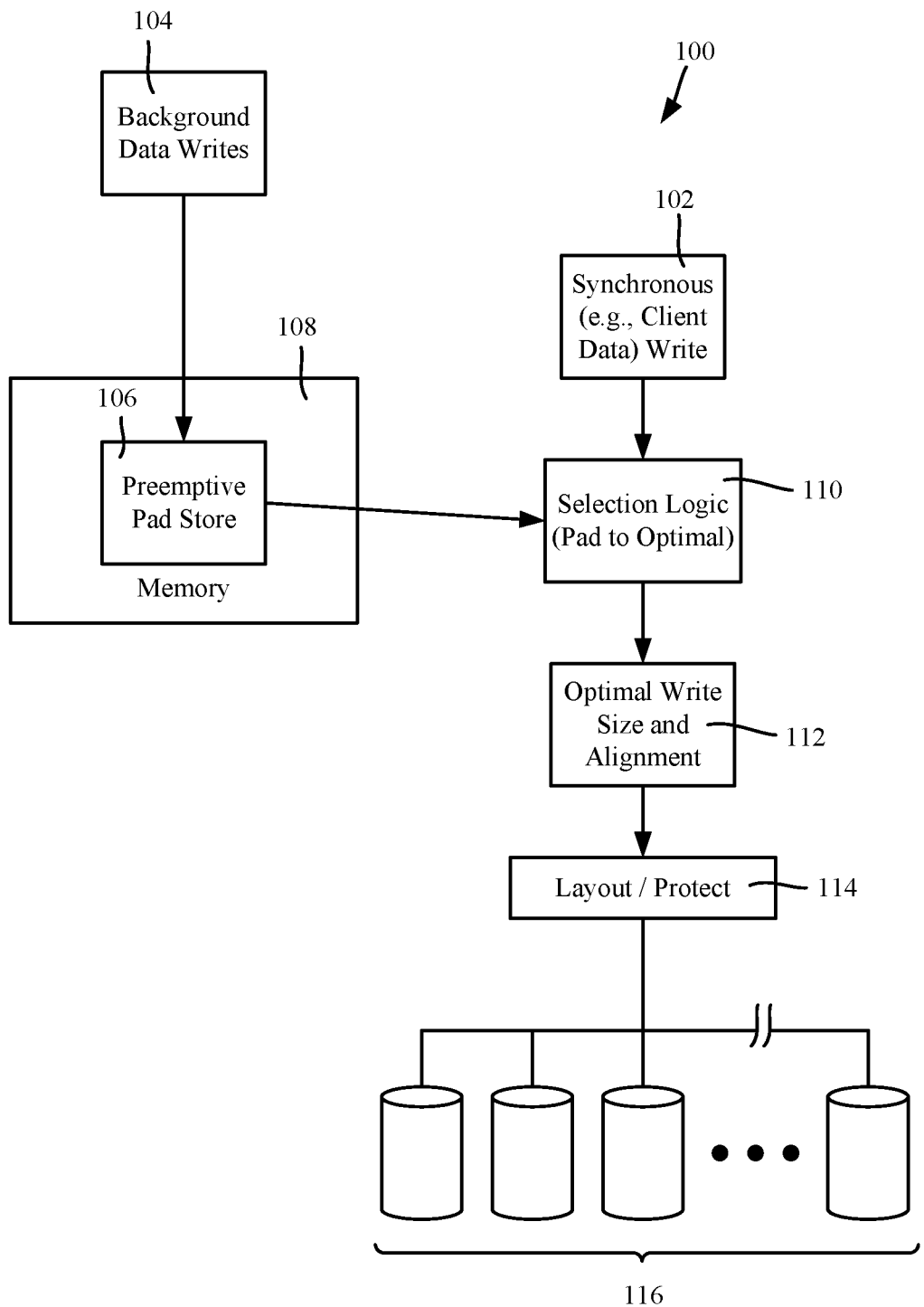
FIG. 1 depicts an example block diagram representation of an example system/architecture for padding a client data write, in accordance with various aspects and implementations of the subject disclosure.

FIG. 1 is an example representation of a system/architecture 100 in which synchronous client write data 102 is padded to achieve a data write that is optimally sized for a storage system. Such client data writes are referred to herein as "synchronous" data writes, because the client is often (though not always) synchronously waiting for an acknowledgement that the write occurred.

Note that what is considered an optimally sized data write can vary among storage systems, e.g., 4 KB (kilobytes) for one system, 64 KB for another storage system, 1 MB (megabyte) for yet another storage system, and so on; once set these do not ordinarily change for a given storage system. More particularly, in many storage systems, there is a write size and alignment boundary that is considered "optimal" and can be written faster than other sizes of data writes. For reliable enterprise storage, this is typically dictated by the redundancy protection added to the system, such as the error correction code (ECC)-protection at disk-block level, and redundant array of independent disks (RAID) protection at write-stripe level. Writes that exactly align to these boundaries can occur without considering any prior state for this region of data, and can blindly write the new data out. For example, in one situation, a storage system can perform a 1 MB region data write on a 1 MB-aligned boundary more efficiently than a smaller or unaligned write, because the storage system can calculate and write the data and parity blocks for its internal physical protection scheme directly to their final destination, without needing to inject any read-modify-write delays on the data, nor having to track (in a different location or fashion) any remnant data from the head or tail of the I/O.

As shown in FIG. 1, background data writes 104 are used to fill a preemptive pad store with pending write data from some background operation. As described herein, certain background data writes result from a background load of larger writes that can happen at higher latency. This can be for various reasons that can include flushing the log of low-latency writes into more permanently allocated locations, repairing or otherwise recalculating protections, reencoding the data to leverage different characteristics such as changing data-reduction encodings (to be stored using less space, or to be stored in a way that is faster to read), or changing encryption. Another reason is when moving the data between storage tiers with different physical media characteristics, such as from slower hard disk drive (HDD) storage to faster solid-state drive (SSD) storage, or vice versa.

Thus, non-limiting examples of generating background data include when a block or file storage system does some active tiering between physical tiers or between compression levels; some of the tiering or compression work can be deferred to create preemptive padding data. Another example includes a block or file storage system that is moving data as part of a repair, rebalance, deduplication or defragmentation operation; the system can defer some of that work to create preemptive padding.

This write data are referred to herein as "background" data writes, because they are often (although not always) triggered as part of a background activity. Note that a set of client writes that are occurring as part of a batch operation can also qualify as "background" writes, if their write performance is less critical than other data writes.

The technology described herein can shape or otherwise arrange the background write load data in a preemptive pad store 106 to allow the background data to be used to improve the performance of the low-latency synchronous writes. Instead of treating the background work as a stream of its own, described herein is using the background operations as a source of readily available padding material that can be combined with the new client I/O, that is, to pad the client I/O to optimal boundaries.

To avoid the typical penalty of buffering client I/O, in one example implementation the preemptive-pad material is kept in a non-volatile location 108. Note that in this example implementation, if that storage system reboots or otherwise loses state, that system loses the work that was done to create the preemptive padding. As such, there is a practical upper bound on how much preemptive-pad material is to be generated and maintained at any given time, which can vary from system to system. Note however that in such situations, the data in the pad store 106 is not lost, and are regenerated because the lost pending writes have not yet been acknowledged.

As shown in FIG. 1, selection logic 110 combines some amount of background write data from the preemptive pad store 106 with the synchronous (e.g., client data) write 102 to obtain a data structure/dataset based on the optimal write size/alignment criteria of the storage system. By way of a straightforward example, consider that a system has preemptive padding available, and is configured to respond to each client I/O request right away. When the client I/O data write (e.g., 4 KB) arrives to be written, the selection logic 110 recognizes the size, e.g., given a client I/O of 4 KB and an optimal write-size of 128 KB, the selection logic 110 adds the client I/O to 124 KB (128 KB−4 KB=124 KB) of preemptive-padding to make an optimal write dataset, and then takes action to complete the write, e.g., sends the write dataset to a lower storage system component.

In FIG. 1 the selection logic 110 that provides the write dataset 112 is shown as a layer/component above the storage system's layout/protect logic 114 that writes the data in the data structure to the storage devices 116 as appropriate for the protection/redundancy configured in a given storage system. Note that although not explicitly labeled in FIG. 1, the storage system can be considered as including the layout/protect logic 114 and the storage devices; the selection logic 110 can be part of the storage system or a separate component above the storage system.

Figure 2:
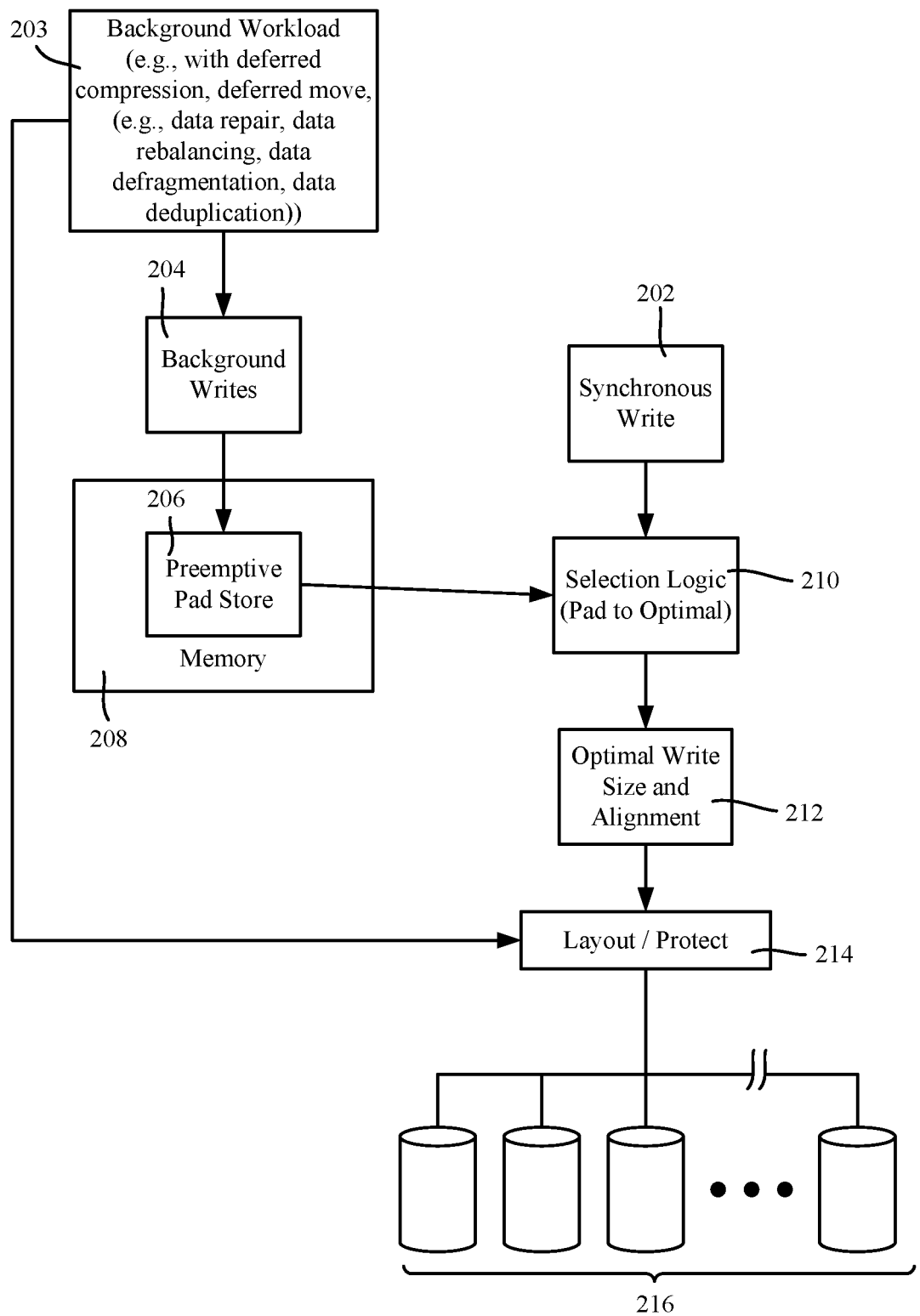
FIG. 2 depicts an example block diagram representation of an example system/architecture for padding a client data write while also performing separate background data writes, in accordance with various aspects and implementations of the subject disclosure.

FIG. 2, in which components/data structures labeled 1xx in FIG. 1 are labeled 2xx in FIG. 2, is similar to FIG. 1 and is not described in detail herein except to note that in FIG. 2, a background workload 203 proceeds generally as before, that is, including creating and writing some optimally-sized payload data directly to storage. However, in the example of FIG. 2, not all the payload is used in the preemptive pad-store 206; instead some of the background workload 203 is written directly to the storage system, such as to minimize any excess latency, or make sure appropriate service level agreements for the background operations are met. Thus, only part of the payload is used by the background workload 203 to generate an excess of payload material (the background writes 204 for preemptive padding), making some of it available in the pad store 206. As a new client I/O 202 comes in, the selection logic 210 consumes this excess data from the preemptive padding store 206 to turn the data write into an optimally-sized I/O 212.

FIG. 3 is a table that summarizes some characteristics of storage systems. As can be seen in FIG. 3, the use of preemptive padding as described herein provides lower latency and expense (e.g., the computational expense of performing this path) with respect to client I/O than typical storage systems. Further, the technology described herein avoids the inefficiencies that result from typical client I/O in which the storage system has no control over how much data is written, when it is written, or to where it is written. Less efficient solutions (relative to the technology described herein) include buffering the client data to see if further writes arrive that can be paired therewith to make an optimal write, or persistently storing client write data temporarily (often in a less efficient manner, such as mirrored instead of parity-protected, and/or in more expensive media such as non-volatile DIMM instead of SSD, or SSD instead of HDD). Issuing the write inefficiently to the final destination has other performance inefficiencies (read-modify-write) or storage inefficiencies (different protection schemes or the like).

Figure 4:
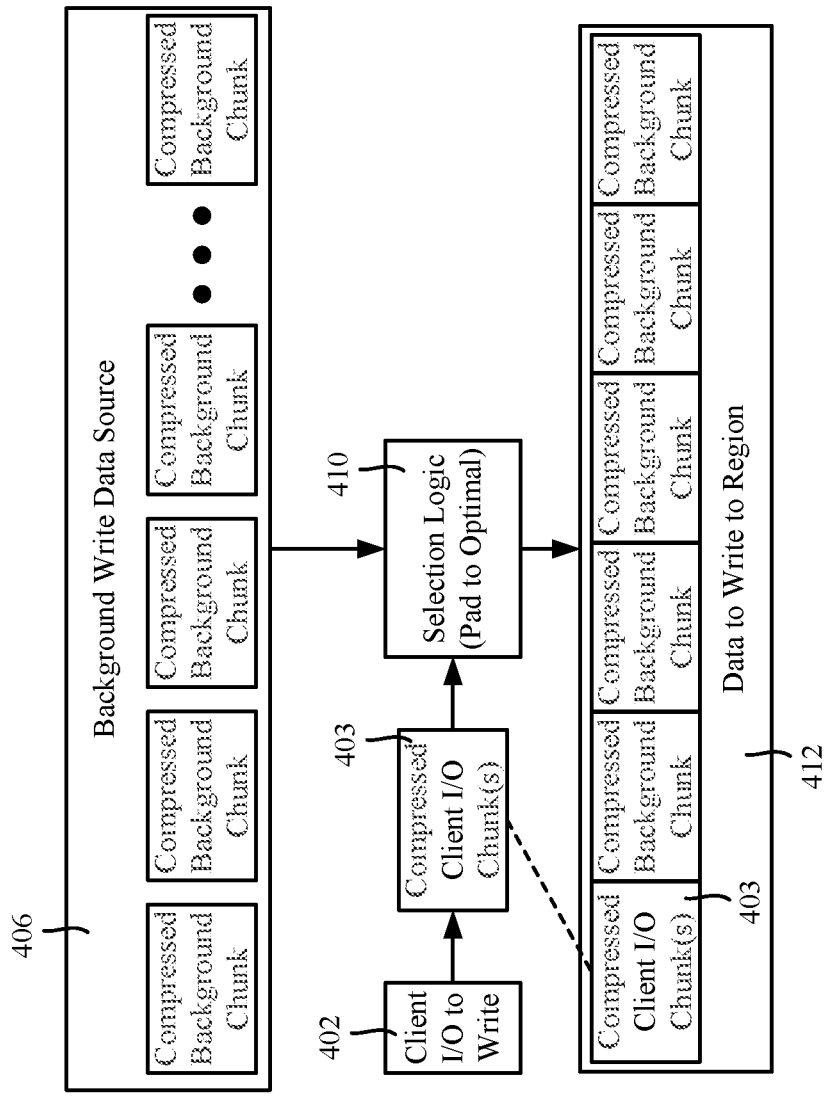
FIG. 4 is an example block diagram representation of maintaining and using padding data in conjunction with client write data, in accordance with various aspects and implementations of the subject disclosure.

As can be understood, there are different ways the preemptive-padding data can be maintained, which may depend on the exact nature of the storage system. As one non-limiting example, consider a block storage system/cluster that exposes data as logical 4 KB blocks at 4 KB boundaries, and internally compresses those 4 KB blocks into smaller chunks (e.g., varying sizes around 1 KB average if achieving 4:1 compression). In this example, the storage cluster can aggregate the blocks together into 1 MB regions, and then write those 1 MB regions out in an optimal fashion. As shown in the example of FIG. 4, to leverage preemptive padding in this cluster, the system preemptively creates background data in the form of some amount (e.g., 16 MB) of individual compressed chunks of smaller size or sizes, but does not yet group those chunks into 1 MB regions. When a new client I/O 402 comes in, that I/O 102 can be processed as normal into its own compressed chunk or chunks 403, with some of the individual preemptive-padding compressed chunks added thereto (data structure 412) until the 1 MB region boundary is reached.

Another way to leverage preemptive padding in such a system or similar system is instead of preserving individual compressed chunks, the system can use those compressed chunks to create a collection of almost-finished 1 MB regions. This is shown in the non-limiting example of FIG. 5, in which one almost-finished region of (1 MB-8 KB), one at (1 MB-16 KB), three at (1 MB-32 KB), one at (1 MB-64 KB) and so on are available for combining with client write data. When new client I/O 502 comes in, e.g., less than or equal to 32 KB after compression, the selection logic 510 selects the most appropriate almost-finished 1 MB region 505 (of size 1 MB-32 KB), to which the client data write 502 is to be added, adds the client data write 502, and completes the write.

Figure 5:
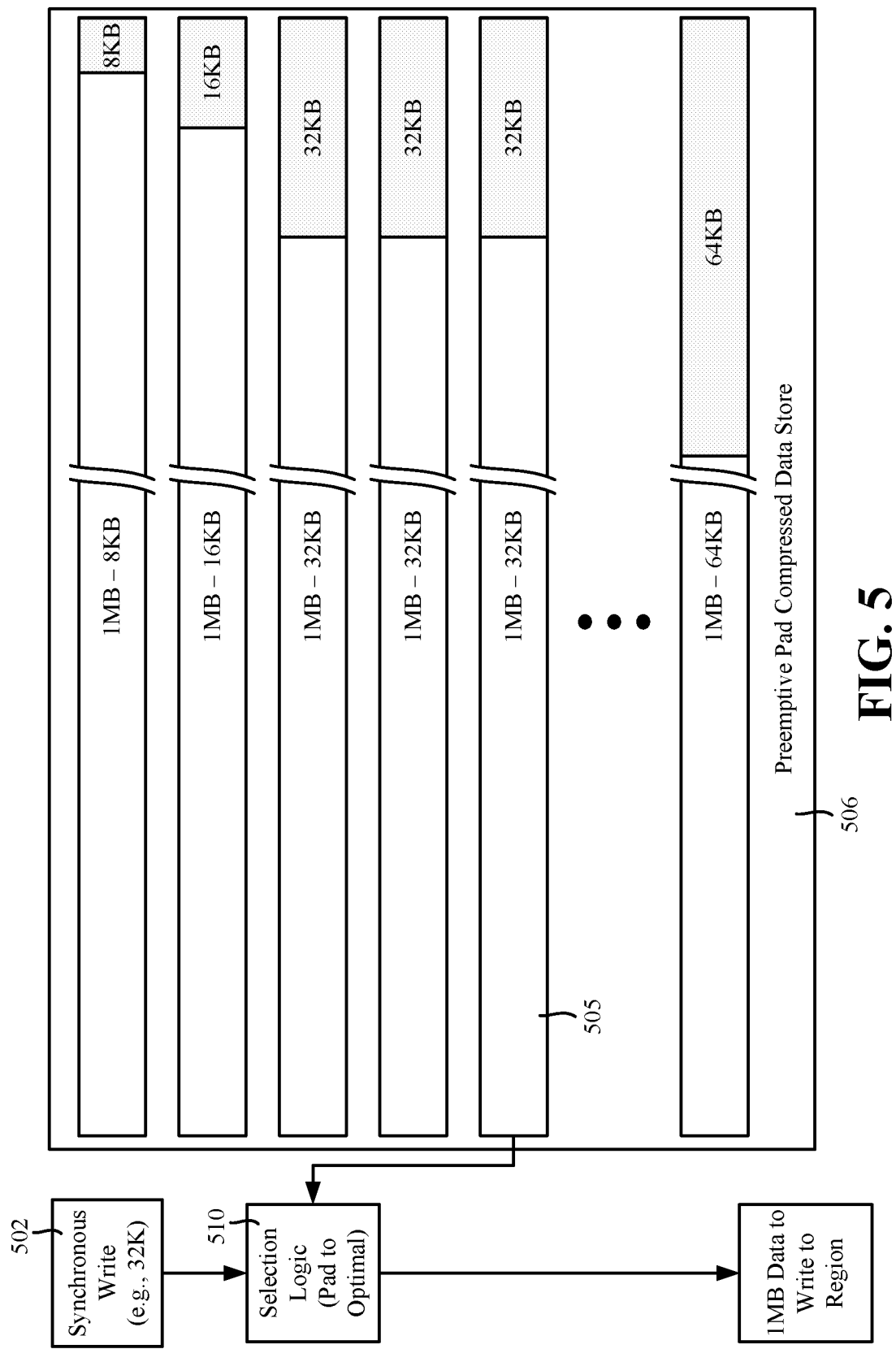
FIG. 5 is an example block diagram representation of maintaining and selecting from among almost-completed padding data regions in conjunction with client write data, in accordance with various aspects and implementations of the subject disclosure.

It should be noted that in any of the examples herein, the storage system already is configured to map the sizes and offsets to the logical target location for a data write and the associated physical location, so that the correct data is returned in response to a read. Further, if a write does not exactly fill a region, the region is still fully written as described herein, with some unused space. In the example of FIG. 5, consider that the client data write was 31 KB; the most appropriate almost-finished 1 MB region 505 (of size 1 MB-32 KB) is still selected, with 1 KB written as part of the writing of the region but not used.

A general goal of a storage system is to serve client I/O as fast as possible, which typically means with the lowest latency possible. The storage system also needs to complete its background write work, though how aggressively to do so is configurable, which can be controlled by having the preemptive pad store replenished as needed, e.g., when it falls below a threshold lower level of available data. If needed, such as when client data writes are not arriving fast enough, some of the older data in the preemptive pad store can be flushed to storage, and replenished with newer data.

Notwithstanding the general storage system goal of serving fast client I/O, there may be scenarios/certain types of data in which some amount of write latency is acceptable. If a system that has preemptive padding available is allowed such latency (e.g., 500 μs), client write data can be collected into a batch before laying it out. That is, the system can collect data into a batch, and fill the batch to a more optimal layout using the preemptive padding data. To this end, the system sends the batch through similar write logic as described herein, so as to batch some client data together, and also consume some extra preemptive-padding material to make the client data write optimally-sized.

Figure 6:
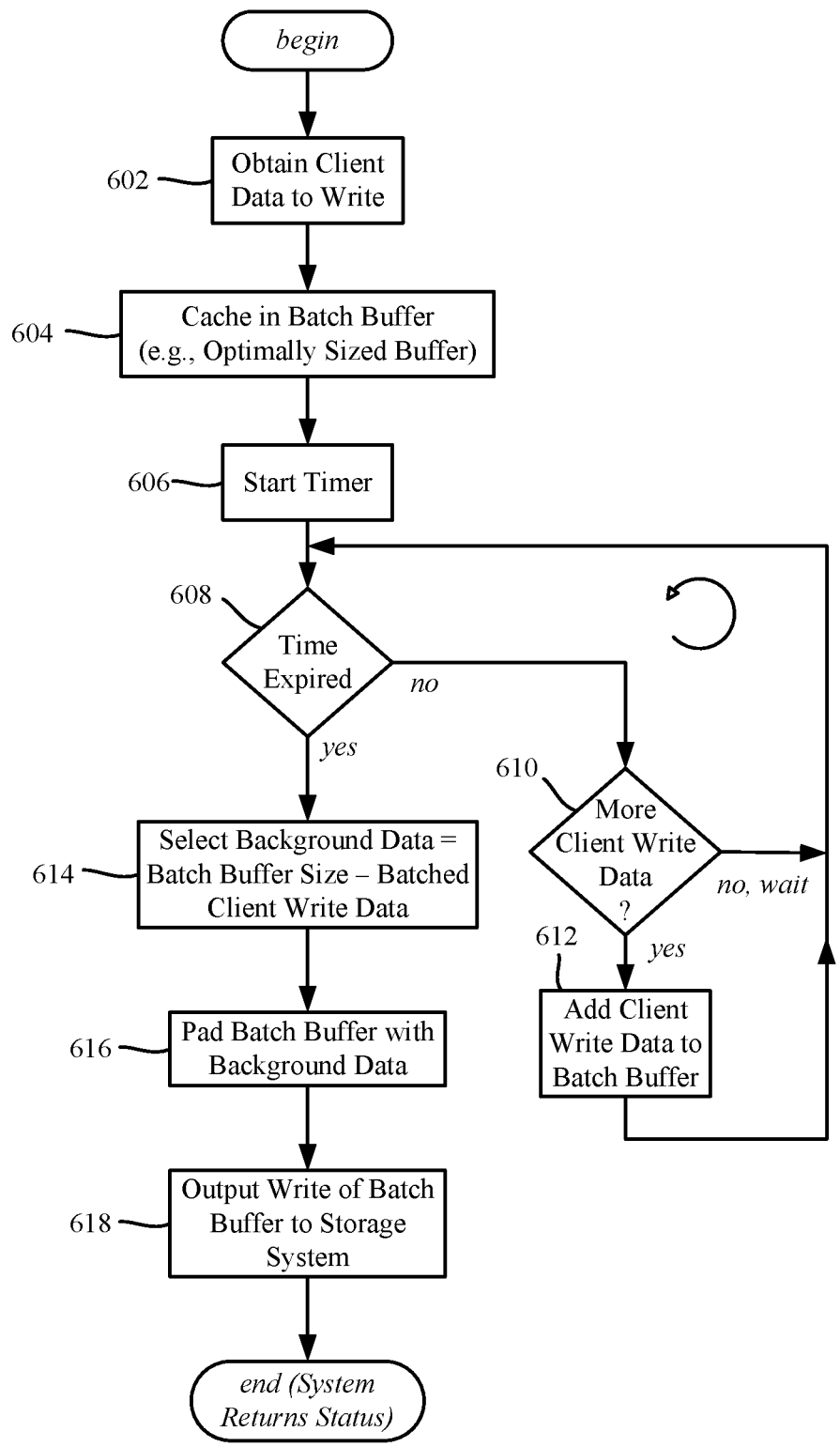
FIG. 6 is a flow diagram showing example operations related to batching client data writes prior to padding the data writes to an optimal data write size, in accordance with various aspects and implementations of the subject disclosure.

FIG. 6 shows one possible example of operations that facilitate such batching, beginning at operation 602 where some client data to write is received. Operation 604 caches the client data into a buffer, e.g., optimally sized for the storage system write. Operation 606 starts a timer that is evaluated at operation 608 based on the acceptable latency.

As can be seen via operation 610 and 612, until the batching time is expired, any further client data writes are batched by adding them to the batch buffer; (note that this example assumes that the client data writes to not fill the batch buffer; if they approach an upper limit then the batch buffer limit can act similar to the time expiring, e.g., operation 608 can be time expired or upper limit reached).

In any event, at some point the data write is to occur, whereby operation 614 selects the padding data based on the remaining space in the batch buffer, (e.g., via the example implementations of FIG. 4 or FIG. 5) and operation 616 performs the padding of the data write into the batch buffer. Operation 618 then sends the optimally sized write to the next level of the storage system, e.g., the layout/protect level in FIGS. 1 and 2.

Figure 7:
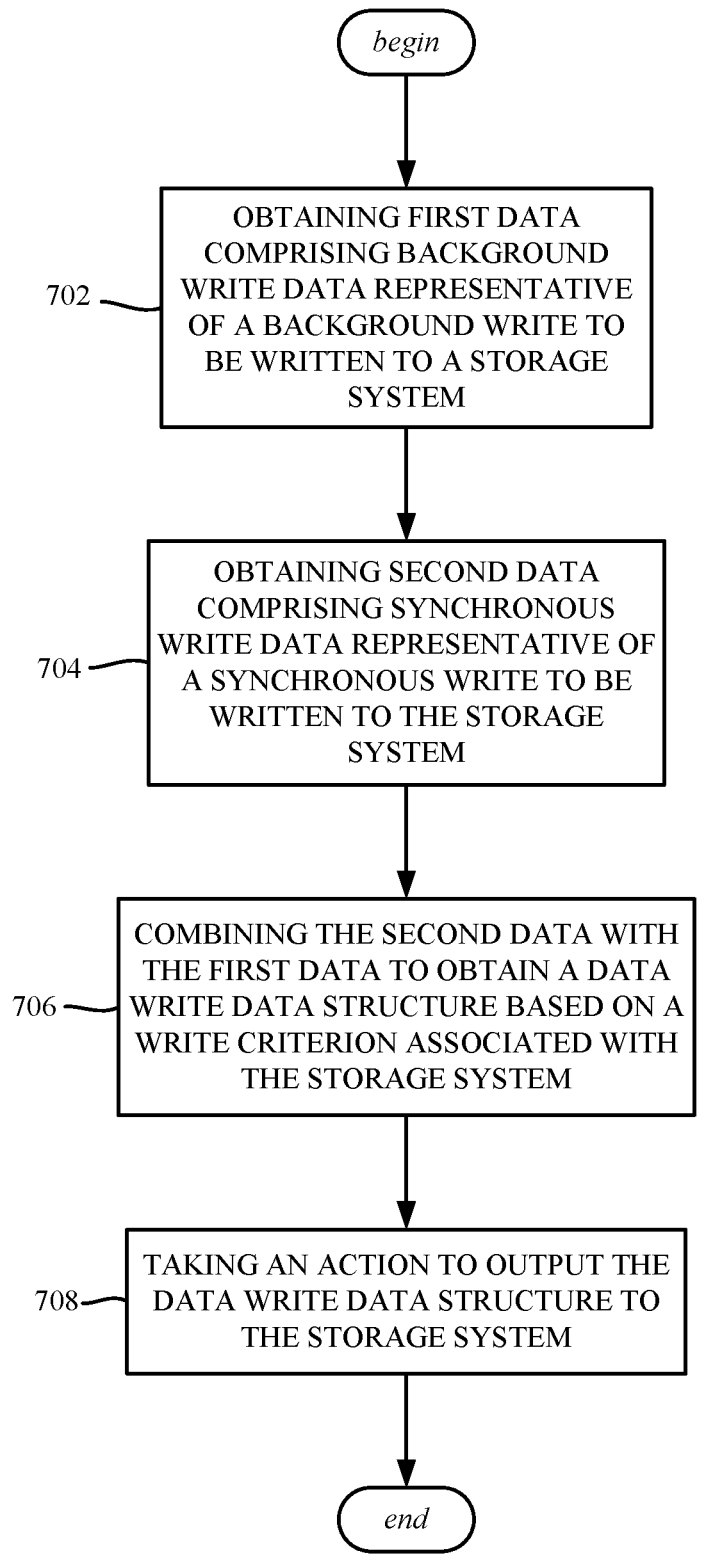
FIG. 7 is a flow diagram showing example operations related to combining first and second data to obtain a data write data structure based on a write criterion associated with a storage system, in accordance with various aspects and implementations of the subject disclosure.

One or more aspects can be embodied in a system, such as represented in the example operations of FIG. 7, and for example can include a memory that stores computer executable components and/or operations, and a processor that executes computer executable components and/or operations stored in the memory. Example operations can include operation 702, which represents obtaining first data comprising background write data representative of a background write to be written to a storage system. Example operation 704 represents obtaining second data comprising synchronous write data representative of a synchronous write to be written to the storage system. Example operation 706 represents combining the second data with the first data to obtain a data write data structure based on a write criterion associated with the storage system. Example operation 708 represents taking an action to output the data write data structure to the storage system.

The write criterion can be evaluated with respect to at least one of: write size data representative of a write size, or write alignment data representative of a write alignment.

Further operations can include at least one of compressing at least a portion of the background data into the first data, or performing data-reduction on at least a portion of the background data to obtain the first data. Note that some data-reduction techniques can be considered a combination of compression and deduplication, such as "similarity-delta encryption."

Further operations can include at least one of compressing at least a portion of the synchronous write data into the second data, or performing data-reduction on at least a portion of the synchronous write data to obtain the second data.

Further operations can include compressing respective portions of the background data into respective regions, and selecting the first data from one of the respective regions, based on the write criterion, to obtain a selected region; combining the second data with the first data to obtain a data write can include adding the second data to the selected region.

Taking the action can include compressing background write data into a group of compressed chunks, compressing the synchronous write data into a compressed synchronous write chunk, aggregating one or more compressed chunks of the group and the compressed synchronous write chunk into a region based on the write criterion, and writing the region to the storage system.

Obtaining the first data can include generating the background write data by deferring background write operations. Generating the background write data can include deferring background write operations between levels of background compression.

Generating the background write data can include deferring background write operations corresponding to moving data within the storage system. Moving the data within the storage system can correspond to at least one of: data repair of at least part of the data, data rebalancing of at least part of the data, data defragmentation of at least part of the data, or data deduplication of at least part of the data.

Obtaining the second data can include obtaining first synchronous write data representative of a first synchronous write, obtaining second synchronous write data representative of a second synchronous write different from the first synchronous write, and batching the first synchronous write data and the second synchronous write data into the second data.

Obtaining the first synchronous write data and the obtaining of the second synchronous write data can occur within a defined timeframe.

Figure 8:
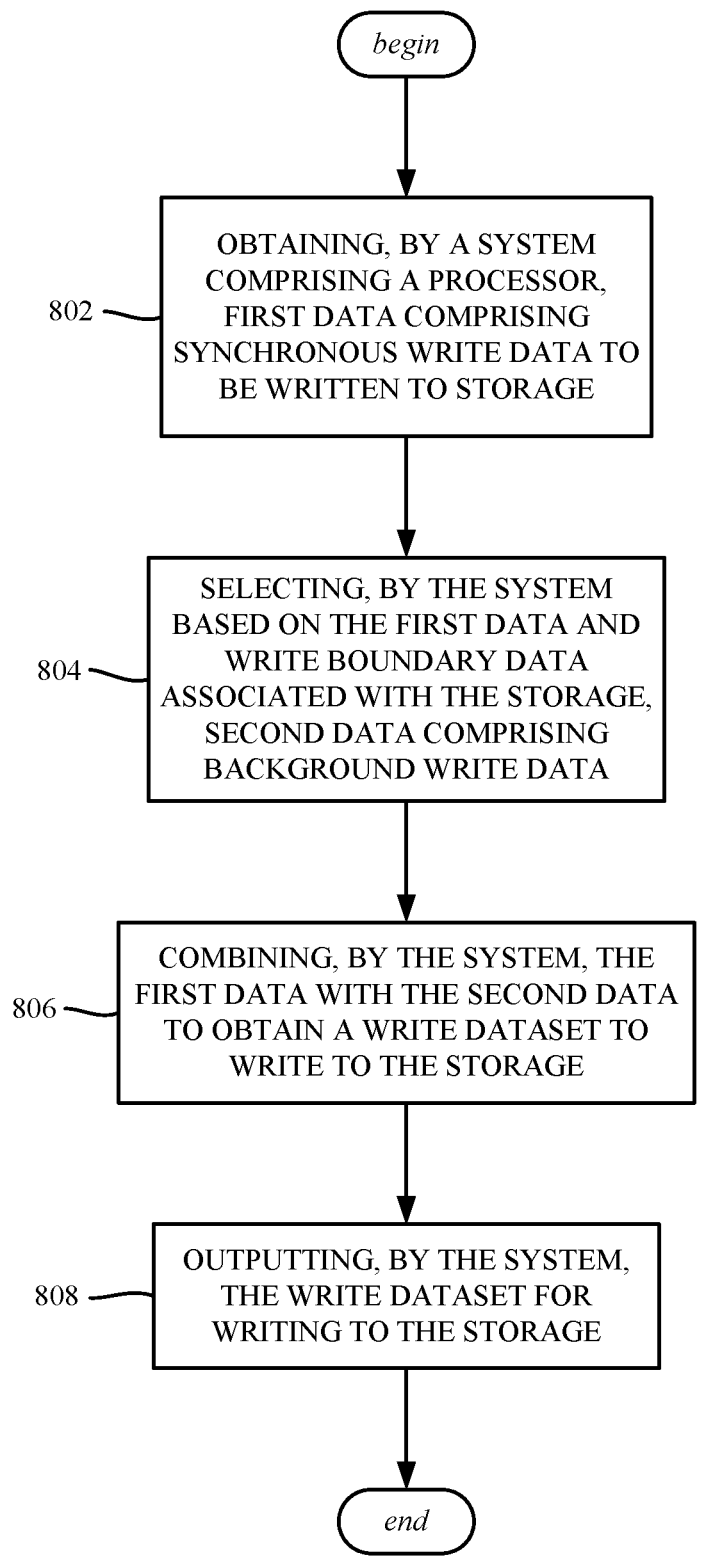
FIG. 8 is a flow diagram showing example operations related to combining synchronous write data with background write data to obtain a write dataset for outputting to storage, in accordance with various aspects and implementations of the subject disclosure.

One or more example aspects, such as corresponding to example operations of a method, are represented in FIG. 8. Example operation 802 represents obtaining, by a system comprising a processor, first data comprising synchronous write data to be written to storage. Example operation 804 represents selecting, by the system based on the first data and write boundary data associated with the storage, second data comprising background write data. Example operation 806 represents combining, by the system, the first data with the second data to obtain a write dataset to write to the storage. Example operation 808 represents outputting, by the system, the write dataset for writing to the storage.

Obtaining the first data can include compressing the synchronous write data into the first data having a first compressed size, and selecting the second data can include selecting compressed background data having a second compressed size based on the write boundary data and the first compressed size.

The write boundary data can correspond to a region, the first data can have a first size, the second data can be maintained among a group of compressed chunks, selecting the second data can include selecting a subgroup of the compressed chunks from the group based on a second size determined from the write boundary data and the first size, and combining the first data with the second data to obtain the write dataset can include adding the first data to the subgroup to obtain the write dataset corresponding to the region.

Obtaining the first data can include obtaining first synchronous write data, obtaining second synchronous write data within a defined timeframe after the obtaining of the first synchronous write data, and batching the first synchronous write data and the second synchronous write data into the first data.

Figure 9:
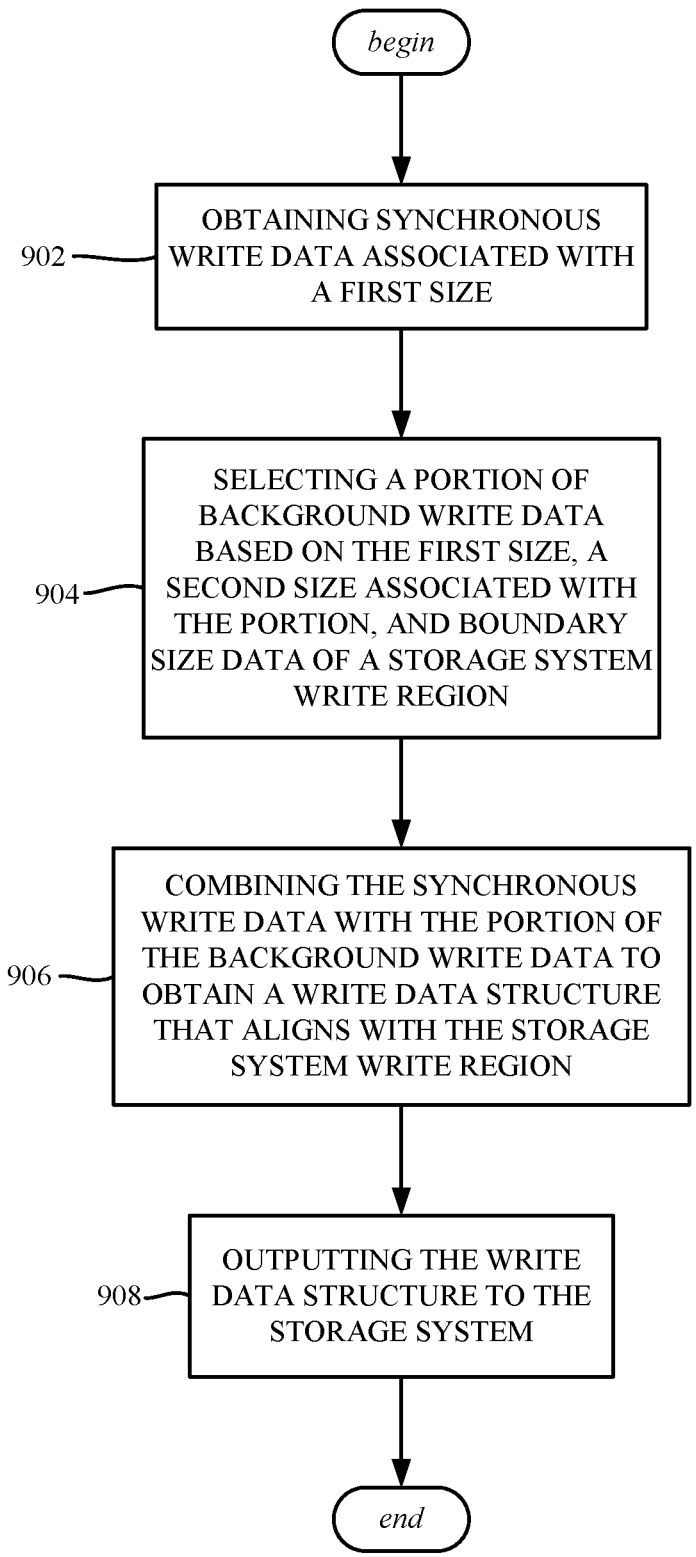
FIG. 9 is a flow diagram showing example operations related to selecting a portion of background write data based on synchronous write data size, and combining the data with the synchronous write data for outputting to a storage system, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents obtaining synchronous write data associated with a first size. Example operation 904 represents selecting a portion of (e.g., the available) background write data based on the first size, a second size associated with the portion, and boundary size data of a storage system write region. Example operation 906 represents combining the synchronous write data with the portion of the background write data to obtain a write data structure that aligns with the storage system write region. Example operation 908 represents outputting the write data structure to the storage system.

Further operations can include maintaining the background write data; maintaining the background write data can include storing the background write data as compressed data in non-volatile storage.

Further operations can include maintaining the background write data, maintaining the background write data can include organizing the background write data into chunks of pending background write data, wherein the chunks are sized based on the storage system write region.

Obtaining the synchronous write data can include batching first synchronous data with second synchronous data obtained within a defined timeframe.

As can be seen, the technology described herein facilitates efficient, low latency data writes for smaller data write operations on a storage system having some specific size data and alignment data for writes that would perform better than others, as the technology described herein meets those boundaries more efficiently than other systems. To this end, the storage system leverages write activity that is deemed less performance-critical that can be manipulated (and possibly slowed down/deferred) for the benefit of the higher-performance data writes.

Figure 10:
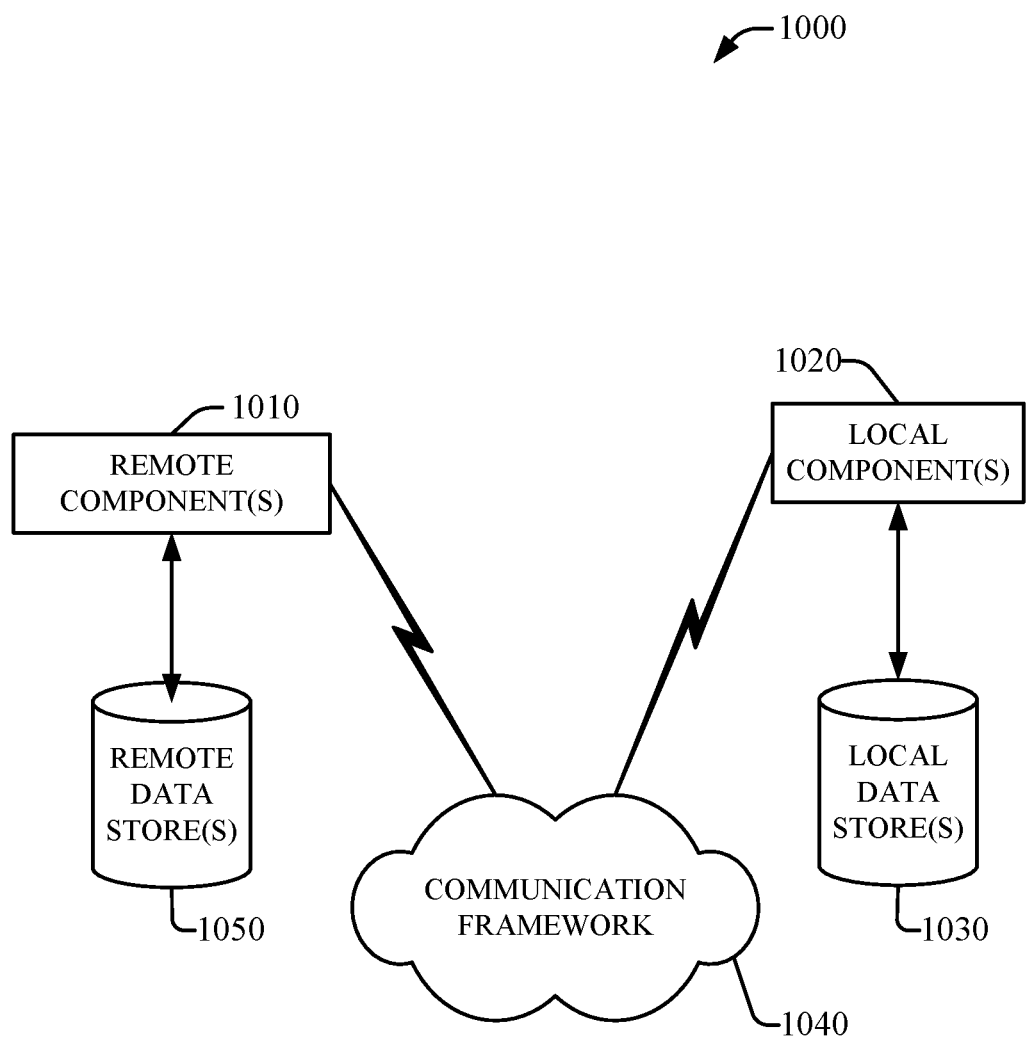
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
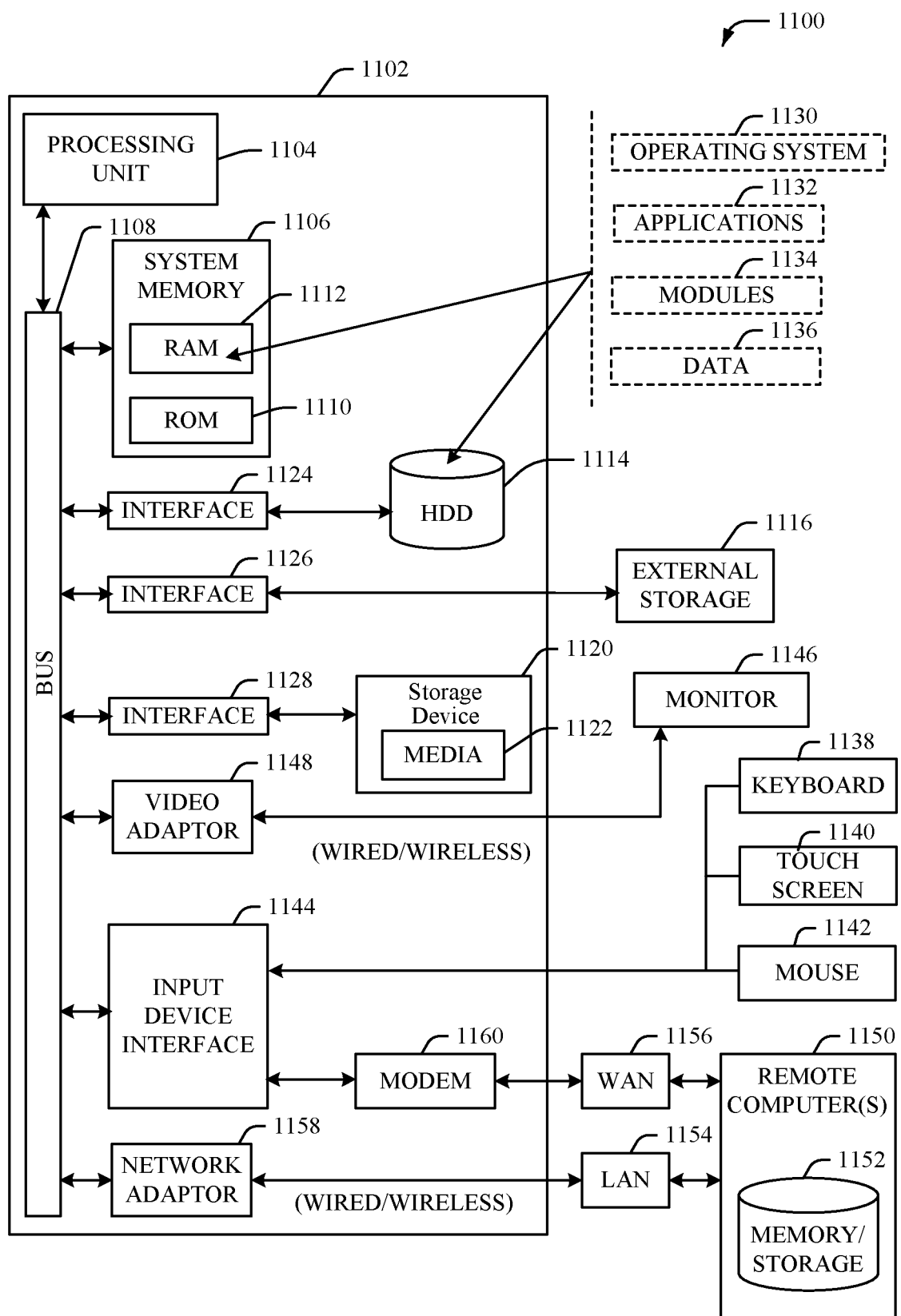
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   at least one processor; and
   at least one memory that stores executable instructions that, when executed by the at least one processor, facilitate performance of operations, the operations comprising:
   generating a preemptive pad store comprising a group of background write data pending to be written to a storage system via background writes by deferring a subset of background write operations to the storage system, wherein the subset of background write operations comprises one or more background write operations between levels of background compression;
   selecting, based on a write criterion associated with the storage system, from the preemptive pad store comprising a group of background write data pending to be written to the storage system via background writes, first data to be employed as pad data for synchronous writes to the storage system, wherein the first data comprises a subgroup of the group of background write data representative of a background write to be written to the storage system;

obtaining second data comprising synchronous write data representative of a synchronous write to be written to the storage system, wherein the synchronous write data is assigned a low latency criterion to perform the synchronous write with latency below a defined latency threshold, wherein the background write data is assigned a high latency criterion indicating that performance of the background write with latency that is not below the defined latency threshold is acceptable, wherein the group of background write data is associated with background operations of the storage system, and wherein the synchronous write data is associated with client operations of at least one client of the storage system;

combining the second data with the first data as the pad data for the second data to obtain a data write data structure; and taking an action to output the data write data structure to the storage system.

2. The system of claim 1, wherein the write criterion is evaluated with respect to at least one of: write size data representative of a write size, or write alignment data representative of a write alignment.

3. The system of claim 1, wherein the operations further comprise at least one of: compressing at least a portion of the subgroup of the background write data into the first data, or performing data-reduction on at least the portion of the subgroup of the background write data to obtain the first data.

4. The system of claim 1, wherein the operations further comprise at least one of: compressing at least a portion of the synchronous write data into the second data, or performing data-reduction on at least the portion of the synchronous write data to obtain the second data.

5. The system of claim 1, wherein the operations further comprise compressing respective portions of the group of background write data into respective regions, and selecting the first data from one of the respective regions, based on the write criterion, to obtain a selected region, and wherein the combining of the second data with the first data to obtain the data write data structure comprises adding the second data to the selected region.

6. The system of claim 1, wherein the taking of the action comprises compressing the subgroup of background write data into a group of compressed chunks, compressing the synchronous write data into a compressed synchronous write chunk, aggregating compressed chunks of the group and the compressed synchronous write chunk into a region based on the write criterion, and writing the region to the storage system.

7. The system of claim 1, wherein the subset of background write operations further comprises one or more background write operations corresponding to moving data within the storage system.

8. The system of claim 7, wherein the moving of the data within the storage system corresponds to at least one of: data repair of at least part of the data, data rebalancing of at least part of the data, data defragmentation of at least part of the data, or data deduplication of at least part of the data.

9. The system of claim 1, wherein the obtaining of the second data comprises obtaining first synchronous write data representative of a first synchronous write, obtaining second synchronous write data representative of a second synchronous write different from the first synchronous write, and batching the first synchronous write data and the second synchronous write data into the second data.

10. The system of claim 9, wherein the obtaining of the first synchronous write data and the obtaining of the second synchronous write data occurs within a defined timeframe.

11. A method, comprising:

generating, by a system comprising at least one processor, a preemptive pad store comprising a group of background write data by deferring a subset of background write operations to storage, wherein the subset of background write operations comprises one or more background write operations corresponding to moving data within the storage;

obtaining, by the system comprising at least one processor, first data comprising synchronous write data to be written to the storage via synchronous writes;

selecting, by the system based on the first data and write boundary data associated with the storage, from the preemptive pad store comprising a group of background write data pending to be written to the storage, second data to be employed as pad data for the synchronous writes to the storage via background writes, wherein the second data comprises a subgroup of the background write data, wherein the synchronous write data is assigned a low latency criterion for the synchronous write data being written to the storage with latency that is below a defined latency threshold, wherein the background write data is assigned a high latency criterion indicating that the background write data being written to the storage with latency that is not below the defined latency threshold is acceptable, wherein the group of background write data is associated with background operations of the storage system, and wherein the synchronous write data is associated with client operations of at least one client of the storage system;

combining, by the system, the first data with the second data as the pad data for the first data to obtain a write dataset to write to the storage; and outputting, by the system, the write dataset for writing to the storage.

12. The method of claim 11, wherein the obtaining of the first data comprises compressing the synchronous write data into the first data having a first compressed size, and wherein the selecting of the second data comprises selecting compressed background write data having a second compressed size based on the write boundary data and the first compressed size.

13. The method of claim 11, wherein the write boundary data corresponds to a region, wherein the first data has a first size, wherein the selecting of the second data comprises selecting the subgroup of the background write data based on a second size determined from the write boundary data and the first size, and wherein the combining of the first data with the second data to obtain the write dataset comprises adding the first data to the subgroup to obtain the write dataset corresponding to the region.

14. The method of claim 11, wherein the obtaining of the first data comprises obtaining first synchronous write data, obtaining second synchronous write data within a defined timeframe after the obtaining of the first synchronous write data, and batching the first synchronous write data and the second synchronous write data into the first data.

15. A non-transitory machine-readable medium, comprising executable instructions that, when executed by at least one processor of a device, facilitate performance of operations, the operations comprising:

generating a preemptive pad store comprising a group of background write data by deferring a subset of background write operations to a storage system, wherein the subset of background write operations comprises at least one of:
one or more background write operations between levels of background compression, or
one or more background write operations corresponding to moving data within the storage system;
obtaining first data comprising synchronous write data to be written to the storage system via a synchronous write, wherein the synchronous write data is associated with a first size;
selecting, from the preemptive pad store comprising a group of background write data pending to be written to the storage system via background writes, second data to be employed as pad data for synchronous writes to the storage system, wherein the second data comprises a subgroup of the background write data based on the first size, a second size associated with the subgroup, and boundary size data of a write region of the storage system, wherein the synchronous write data is assigned a low latency criterion for the synchronous write data being written to the storage system with latency that is below a defined latency threshold, wherein the background write data is assigned a high latency criterion indicating that the background write data being written to the storage system with latency that is that is not below the defined latency threshold is acceptable, wherein the group of background write data is associated with background operations of the storage system, and wherein the synchronous write data is associated with client operations of at least one client of the storage system;
combining the first data with the second data as the pad data for the first data to obtain a write data structure that aligns with the write region of the storage system; and
outputting the write data structure for writing to the storage system.

16. The non-transitory machine-readable medium of claim 15, wherein the operations further comprise maintaining the group of background write data, and wherein the maintaining of the group of background write data comprises storing the group of background write data as compressed data in non-volatile storage.

17. The non-transitory machine-readable medium of claim 15, wherein the operations further comprise maintaining the group of background write data, wherein the maintaining of the group of background write data comprises organizing the group of background write data into chunks of pending background write data, and wherein the chunks are sized based on the boundary size data of the write region of the storage system.

18. The non-transitory machine-readable medium of claim 15, wherein the obtaining of the synchronous write data comprises batching first synchronous data with second synchronous data obtained within a defined timeframe.

19. The method of claim 11, wherein the subset of background write operations further comprises one or more background write operations between levels of background compression.

20. The method of claim 11, wherein the moving of the data within the storage corresponds to at least one of: data repair of at least part of the data, data rebalancing of at least part of the data, data defragmentation of at least part of the data, or data deduplication of at least part of the data.

* * * * *